(12) United States Patent
Stauber (10) Patent No.: US 6,903,142 B1
(45) Date of Patent: Jun. 7, 2005

(54) SYSTEM FOR SORTING AND PROCESSING A PLURALITY OF TYPES OF SOLID WASTE PRODUCTS FOR RECYCLING

(76) Inventor: Chaim M Stauber, 1423 55th St., Brooklyn, NY (US) 11219

( * ) Notice: Subject to any disclaimer, the term of this patent is extended or adjusted under 35 U.S.C. 154(b) by 292 days.

(21) Appl. No.: 10/361,931

(22) Filed: Feb. 10, 2003

(51) Int. Cl.$^7$ ................................................. C08J 11/04
(52) U.S. Cl. ....................... 521/40; 99/470; 220/23.86; 241/14; 241/23; 241/24.28; 241/28; 241/65; 264/5; 264/10
(58) Field of Search ....................... 521/40, 48; 99/470; 241/14, 23, 24.28, 28, 65; 264/5, 10; 220/23.86

(56) References Cited

U.S. PATENT DOCUMENTS

| | | | | |
|---|---|---|---|---|
| 3,938,731 A | * | 2/1976 | Ross et al. ..................... | 383/10 |
| 5,111,958 A | * | 5/1992 | Witthoeft ..................... | 220/524 |
| 5,417,338 A | * | 5/1995 | Roy et al. ................. | 220/23.86 |

* cited by examiner

Primary Examiner—Edward J. Cain
(74) Attorney, Agent, or Firm—Michael I. Kroll (57) ABSTRACT

The present invention 10 discloses a trash and garbage processing device which may be sized to fit into a kitchen of a home or sized to be used in a multi-family dwelling. The present invention 10 has a plurality of sorting compartments 12 disposed on the top thereof for receiving various types of waste products. There is a compartment for shrinking and palletizing plastics, another compartment for shredding paper and cardboard 58, another compartment for perishable organic waste 48, a crushing compartment for crushing cans and glass/plastic products 54 and a disposal compartment 60 for non-degradable, solid waste such as bones and batteries. After the various types of waste materials are processed, they are transferred to a conduit to a recycling bin 32 for temporary storage and then thereafter removed from the recycling bin and transferred for final disposal. A paper cutting blade 26 is provided for cutting large pieces of cardboard or paper to proper size for placement into a paper shredding compartment 58. The individual openings 12 of the compartments have lids 14 thereon which have safety locks thereon 22/34 to prevent children from tampering therewith. A plastic handling compartment also may be coated with a non-stick material and the safety locks may use a touch digital keypad as commonly used. Further, the crusher unit may be equipped with a mechanism for determining the UPC codes of the materials.

11 Claims, 11 Drawing Sheets

```
┌─────────────────────────────────────────────────────────────────────────────┐
│ UNLOCK THE SAFETY-LOCK ON THE VANITY LID.                                   │
└─────────────────────────────────────────────────────────────────────────────┘
                                      │
┌─────────────────────────────────────────────────────────────────────────────┐
│ OPEN THE VANITY LID.                                                        │
└─────────────────────────────────────────────────────────────────────────────┘
                                      │
┌─────────────────────────────────────────────────────────────────────────────┐
│ UNLOCK THE SAFETY-LOCK ON THE CAN/GLASS CRUSHER LID.                        │
└─────────────────────────────────────────────────────────────────────────────┘
                                      │
┌─────────────────────────────────────────────────────────────────────────────┐
│ OPEN THE CAN/GLASS CRUSHER LID.                                             │
└─────────────────────────────────────────────────────────────────────────────┘
                                      │
┌─────────────────────────────────────────────────────────────────────────────┐
│ INSERT THE GLASS ITEM TO BE DISPOSED OF INTO THE GLASS/CAN CRUSHING CHAMBER │
│ SO IT IS RESTING ON THE CHAMBER FLOOR WHICH IS A THICK, STURDY GRATE MEMBER │
│ HAVING A PLURALITY OF RECESSES.                                             │
└─────────────────────────────────────────────────────────────────────────────┘
                                      │
┌─────────────────────────────────────────────────────────────────────────────┐
│ CLOSE THE LID ON THE GLASS/CAN CRUSHING CHAMBER.                            │
└─────────────────────────────────────────────────────────────────────────────┘
                                      │
┌─────────────────────────────────────────────────────────────────────────────┐
│ TURN THE GLASS/CAN CRUSHING CHAMBER POWER SWITCH TO THE "ON" POSITION.      │
└─────────────────────────────────────────────────────────────────────────────┘
                                      │
┌─────────────────────────────────────────────────────────────────────────────┐
│ A CRUSHER PLATE IS HYDRAULICALLY MOVED TOWARDS THE GRATE THEREBY            │
│ PULVERIZING GLASS OBJECTS SO THE RESULTANT SHARDS PASS THROUGH THE GRATE    │
│ RECESSES.                                                                   │
└─────────────────────────────────────────────────────────────────────────────┘
                                      │
┌─────────────────────────────────────────────────────────────────────────────┐
│ THE GLASS SHARDS ENTER A TRANSFER CONDUIT WHERE THEY ARE DEPOSITED INTO THE │
│ CORRESPONDING RECYCLING BIN.                                                │
└─────────────────────────────────────────────────────────────────────────────┘
                                      │
┌─────────────────────────────────────────────────────────────────────────────┐
│ OPEN THE VANITY DOOR TO REVEAL THE VARIOUS RECYCLING BINS.                  │
└─────────────────────────────────────────────────────────────────────────────┘
                                      │
┌─────────────────────────────────────────────────────────────────────────────┐
│ SELECT AND REMOVE THE GLASS RECYCLING BIN TO PROPERLY RECYCLE.              │
└─────────────────────────────────────────────────────────────────────────────┘
```

| UNLOCK THE SAFETY-LOCK OF THE VANITY LID. |
|---|
| OPEN THE VANITY LID. |
| UNLOCK THE SAFETY-LOCK OF THE LID TO THE NON-DEGRADABLE SOLIDS COMPARTMENT. |
| OPEN THE LID TO THE NON-DEGRADABLE SOLIDS COMPARTMENT. |
| INSERT THE NON-DEGRADABLE SOLID WASTE INTO THE COMPARTMENT. |
| NON-DEGRADABLE SOLID WASTE DROPS THROUGH THE BOTTOM OF THE COMPARTMENT AND ENTERS THE TRANSFER CONDUIT. |
| NON-DEGRADABLE SOLID WASTE TRAVELS THROUGH THE TRANSFER CONDUIT AND IS DEPOSITED INTO THE NON-DEGRADABLE SOLID WASTE BIN. |
| OPEN THE VANITY DOOR TO REVEAL THE VARIOUS RECYCLING BINS. |
| SELECT AND REMOVE THE NON-DEGRADABLE SOLID WASTE BIN FOR PROPER DISPOSAL OF THE CONTENTS THEREIN. |

SYSTEM FOR SORTING AND PROCESSING A PLURALITY OF TYPES OF SOLID WASTE PRODUCTS FOR RECYCLING

BACKGROUND OF THE INVENTION

1. Field of the Invention

The present invention relates generally to trash processing and sorting devices and, more specifically, to an apparatus for sorting and processing a plurality of types of solid waste products that will allow trash to be sorted and processed at the source of generation.

The present invention is a device whereby refuse can be processed at the source generating recyclable and alleviating municipalities overburdened with garbage that because of the collection process does not tend itself to reclaiming anything other than cans, glass and plastic at best. The present invention preprocesses cans, glass and plastic as well as, paper and food leftovers.

2. Description of the Prior Art

There are other devices for sorting and processing trash for recycling. Typical of these is U.S. Pat. No. 3,938,731 issued to Ross, Jr., et al. on Feb. 17, 1976.

A patent was issued to C. A. Witthoeft on May 12, 1992 as U.S. Pat. No. 5,111,958. Yet another U.S. Pat. No. 5,417,338 was issued to P. J. Roy et al. on May 23, 1995.

U.S. Pat. No. 3,938,731 Inventor: Thorvald S. Ross, Jr. et al. Issued: Feb. 17, 1976

A waste container is designed to accommodate sorting of waste in a plurality of basic categories, such as recyclables, compostables, and terminal wastes. The container is constructed from a plurality of individual components which may be assembled for use. The container includes a floor supported large receptacle which supports a hollow shell having a closeable lid. One or more smaller receptacles are supported within the shell overlying the larger opening. The shell and smaller receptacles are configured to provide, a passageway therebetween to allow direct access to the larger receptacle without disturbing the container's assembled relationship.

U.S. Pat. No. 5,111,958 Inventor: Carol A. Witthoeft Issued: May 12, 1992

A refuse collection unit for household use comprising a container body defining a first storage area adapted to receive at least a conventional plastic refuse bag therein and a second storage area adapted to receive at least two removable rigid liners in a side-by-side disposition therein. The removable liners are each used to store a particular type of recyclable refuse material therein, and the conventional plastic refuse bag for storage of non-recyclable refuse. The liners include a bottom wall, three liner walls and an upwardly stepped fourth wall. Hand-gripping elements are provided on each of said liners. The first storage area rises higher than the second storage area for easy recognition of the areas. In addition, a pair of hinged cover members is provided, one for the first storage area and the other for the second storage area. A third liner may be placed in the first storage area to occupy substantially one-half of said first storage area.

U.S. Pat. No. 5,417,338 Inventor: Pierre J. Roy Issued: May 23, 1995

A waste container is designed to accommodate sorting of waste in a plurality of basic categories, such as recyclables, compostables, and terminal wastes. The container is constructed from a plurality of individual components which may be assembled for use. The container includes a floor supported large receptacle which supports a hollow shell having a closable lid. One or more smaller receptacles are supported within the shell overlying the larger opening. The shell and smaller receptacles are configured to provide a passageway therebetween to allow direct access to the larger receptacle without disturbing the container's assembled relationship.

While these trash sorting and processing devices may be suitable for the purposes for which they were designed, they would not be as suitable for the purposes of the present invention, as hereinafter described. The present invention provides a single appliance having a plurality of receptacles for receiving specific types of solid waste where they are processed and distributed to an appropriate recycling bin. The present invention seeks to alleviate the cost and difficulty inherent in the inefficient recycling programs currently in use by allowing households and businesses to process waste products at the source thereby reducing the volume of recyclables and the burden of transporting the same to recycling plants.

The disposal of solid waste has become increasingly difficult for municipalities as landfills close down and environmental laws further reduce or eliminate options such as incineration. It has become increasingly obvious that recycling is the most viable alternative to conventional solid waste disposal procedures used in the past. Recycling offers an environmentally friendly means for disposing of solid waste while at the same time providing resources for the manufacture of the paper, plastic, glass and metal products which are so critical to our daily lives.

Government agencies at all levels recognize the need for effective recycling and have tried to encourage consumers and businesses to proactively participate in recycling programs. Unfortunately, most, if not all, recycling programs fall far short of their goals despite incentives such as cash deposits and trash sorting laws for consumers and carters.

There are many factors contributing to the shortfalls of these recently instituted recycling programs. Many municipalities rely on the voluntary compliance of the residents who are often reluctant to change when they are used to throwing all of their garbage into one bag or garbage can and letting the problem take care of itself thereby rendering the costly and inefficient process of having the municipality sort the waste if recycling is to take place.

Furthermore, households that aggressively sort their recyclables often become overwhelmed by bundles of papers and large bags of cans, glass and plastic bottles which have to be further separated depending on whether or not they required a deposit. Manually crushing plastic containers and cans is a hassle and inefficient. These bags and bundles are then placed curbside where carters have to haul them to a recycling plant to process the waste products for recycling. The cost for hauling recyclables is sometimes overwhelming to the municipalities because of the unnecessary volume created by bottles, cans and the like that are in their original form resulting in a tremendous amount of the expense in carting recyclables coming from transporting the air contained in the containers. The cost for carting and processing these recyclables is then passed on to the consumer in the form of increased taxes.

The present invention seeks to overcome many of the shortcomings of the current recycling programs by introducing a source trasher that will enable the consumer to easily sort and process recyclable material at the generation point.

The preferred embodiment of the present invention is substantially the size of a typical household appliance so that it can easily fit in a kitchen area. The compact size of the present invention is particularly crucial for placement in apartments that typically comprise the bulk of residencies in congested urban areas that are constantly struggling with their waste removal problems. The present invention has a plurality of sorting compartments on the top portion thereof for receiving the various types of waste products. There is one compartment for shrinking and pelletizing plastic products, one for shredding paper and cardboard, one for dehydrating perishable organic waste, a crusher compartment for crushing cans and pulverizing glass, and a disposal compartment for non-degradable solid waste such as bones and batteries. Once the waste products have undergone their respective processing, they are transported through a transfer conduit to a corresponding recycling bin in a bin compartment where they are stored until emptied. A paper-cutting element is also included for cutting large pieces of cardboard into manageable sized pieces for entry into the paper shredder.

Each processing compartment has a hinged lid to prohibit other materials from inadvertently falling therein. A vanity lid is also provided to protect and restrict access to the various processing units and a vanity door provides access to the bin compartment. The inherent properties of the present invention obviously pose a clear and present danger to children and infants who may gain access to the processing compartments or the bin storage compartment. Therefore, it is imperative that the present invention further includes redundant safety features to prohibit children from gaining access to any area thereof that may endanger the safety of the child. Safety-locks are included on the hinged compartment lids, the vanity lid, and the vanity door leading to the bin storage compartment to restrict access thereto. There are many suitable safety-locks that can be adapted for use with the present invention that may be mechanical, electrical or electronic. The preferred embodiment of the safety-lock is a digital keypad, similar to the access locks on many cars, on or proximal to the related component that releases the lock mechanism when the appropriate PIN number is entered. One PIN number may be used to open each safety lock thereby increasing the ease of use thereof for authorized users. Such a safety lock overcomes the shortcomings of many of the so-called childproof safety-locks that are mechanical and tend to attract children who seek to solve the puzzle. The PIN number may also be changed in the event that an older child has learned the existing PIN.

Widespread use of the present invention will allow carters to transport many times the volume in a single truck than was previously possible thereby reducing the costs of recycling and easing the burden on the taxpayer. Furthermore, the dehydration unit bakes perishable foods until they become odorless particles that can be stored for the sale and use of reconstituted compost, one of the richest and best fertilizers thereby possibly generating a source of revenue for the consumer.

The present invention may be reconfigured in size and shape for adaptation for commercial use or other applications that may require processing a greater volume of waste than that of a standard household. The present invention may also be modified for multi-family dwellings such as apartment buildings wherein a plurality of processing units share common transfer conduits and recycling bins outfitted with a suction device for optimum operation.

SUMMARY OF THE PRESENT INVENTION

The present invention discloses a trash and garbage processing device which may be sized to fit into a kitchen of a home or sized for a multi-dwelling building. The present invention has a plurality of sorting compartments disposed on the top thereof for receiving various types of waste products. There is one compartment for shrinking and palletizing plastics, another compartment for shredding paper and cardboard, another compartment for dehydrating perishable, organic waste, a crushing compartment for crushing cans and glass/plastic products and a disposal compartment for non-degradable, solid waste such as bones and batteries. After the various types of waste materials are processed, they are transferred to a conduit to a recycling bin for temporary storage and then thereafter removed from the recycling bin and transferred for final disposal. A paper cutting blade is provided for cutting large pieces of cardboard or paper to properly size for placement into the paper shredding compartment. The individual openings of the compartments have lids thereon which have safety locks thereon to prevent children from tampering therewith. A plastic handling compartment also may be coated with a non-stick material and the safety locks may use a touch digital keypad as commonly used. Finally, the crusher unit may be equipped with a mechanism for determining the UPC codes of the materials.

A primary object of the present invention is to provide an apparatus for sorting and processing solid waste at the source of generation.

Another object of the present invention is to provide an apparatus for sorting and processing solid waste at the source of generation that will encourage recycling by reducing the clutter of storing recyclables at the home and business.

Yet another object of the present invention is to provide an apparatus for sorting and processing solid waste at the source of generation that will reduce the cost of recycling for municipalities and taxpayers.

Still yet another object of the present invention is to provide an apparatus for sorting and processing solid waste at the source of generation that is compact in size.

Another object of the present invention is to provide an apparatus for sorting and processing solid waste at the source of generation that is safe to have in the presence of children.

Yet another object of the present invention is to provide an apparatus for sorting and processing solid waste at the source of generation that is simple and easy to use.

Still yet another object of the present invention is to provide an apparatus for sorting and processing solid waste at the source of generation that is inexpensive to manufacture and operate.

Additional objects of the present invention will appear as the description proceeds.

The foregoing and other objects and advantages will appear from the description to follow. In the description references is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 opening
14 lid
16 user
18 top panel
20 vanity lid
22 safety lock
24 trash
26 cutting blade
28 cutting blade sheath
30 control panel
32 recycling bin
34 safety lock
36 bin compartment
38 plastics
40 heating element
42 control switch
44 sensor
46 fan
48 perishable foods
50 crusher
52 motor
54 cans and glass/plastic material
56 shredder
58 roller mechanism
60 non-degradable material
62 power source
64 first floor
66 second floor
68 third floor
70 common transfer conduit
72 common transfer conduit
74 recycling bin

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Figure 1:
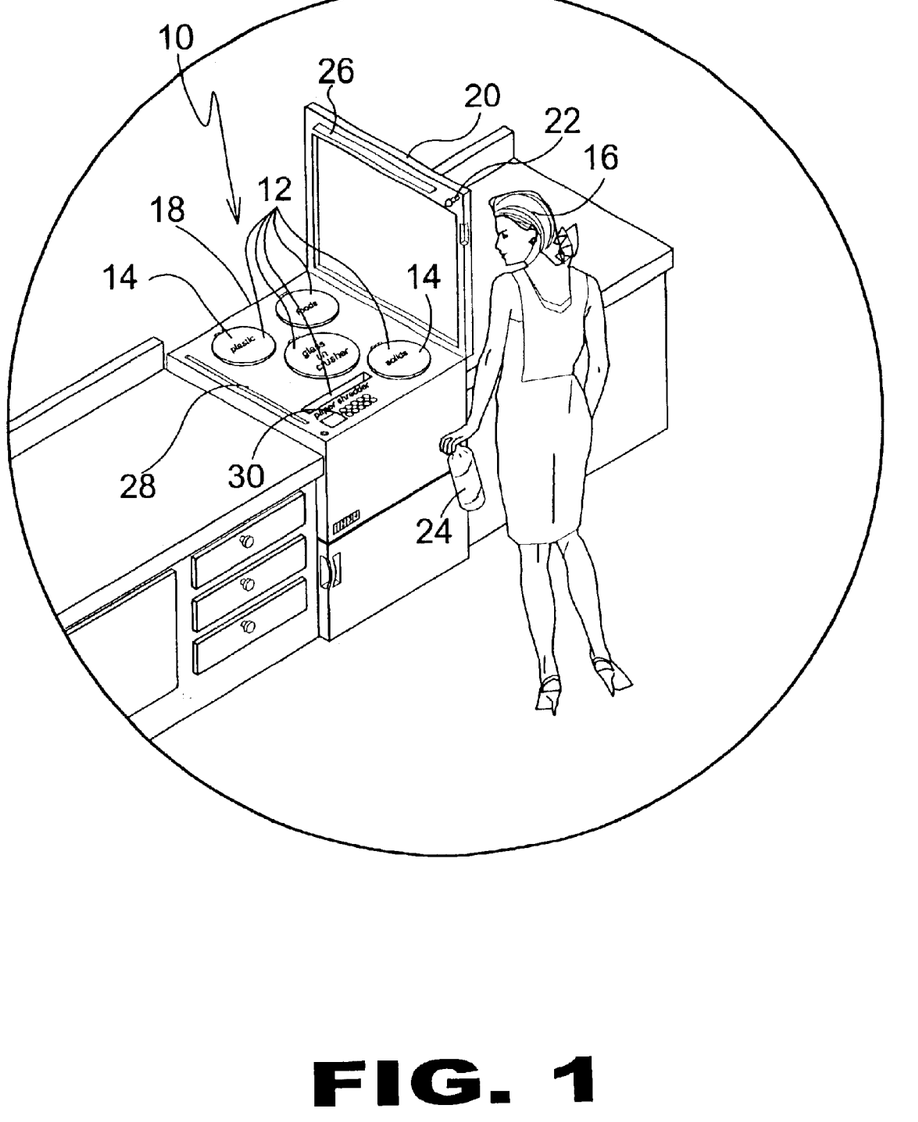
FIG. 1 is an illustrative view of the present invention in use.

Turning to FIG. 1, shown therein is an illustrative view of the present invention 10 in use by a user 16. The present invention 10 is an electrically operated trash processor and recycling unit comprising a housing having five separate compartments for the disposal of different types of household waste. The top panel 18 of the unit (which is covered when not in use by a vanity lid 20 that has a safety-lock 22 to prevent children from opening) comprises a plurality of openings 12, each covered by a hinge fastened lid 14, used for the deposit of the different types of trash 24. Indicia on or proximal to each lid 14 identifies the type of waste product to be placed within each compartment. The preferred embodiment of the present invention 10 is similar in size to a dishwasher and designed for household use. However, larger units with appropriate configurations may be adapted for commercial applications. The present invention 10 will allow consumers and businesses to process and sort waste at the source by crushing cans and glass, dehydrating perishable food products, shrinking plastic goods into a pelletized form, shredding paper and cardboard in a crosscut paper shredder and separating non-degradable solid waste for appropriate disposal. A cutting blade 26 located on the underside of the vanity lid 20 functions similarly to a paper cutter for reducing large pieces of cardboard and soft plastic products into a manageable size for processing. The cutting blade sheath 28 is disposed on top panel 18. A digital control panel 30 is shown for operating the various units and unlocking the compartment lids, however, any other appropriate mechanical, electrical or electronic means may be adapted to achieve these objectives.

Figure 2:
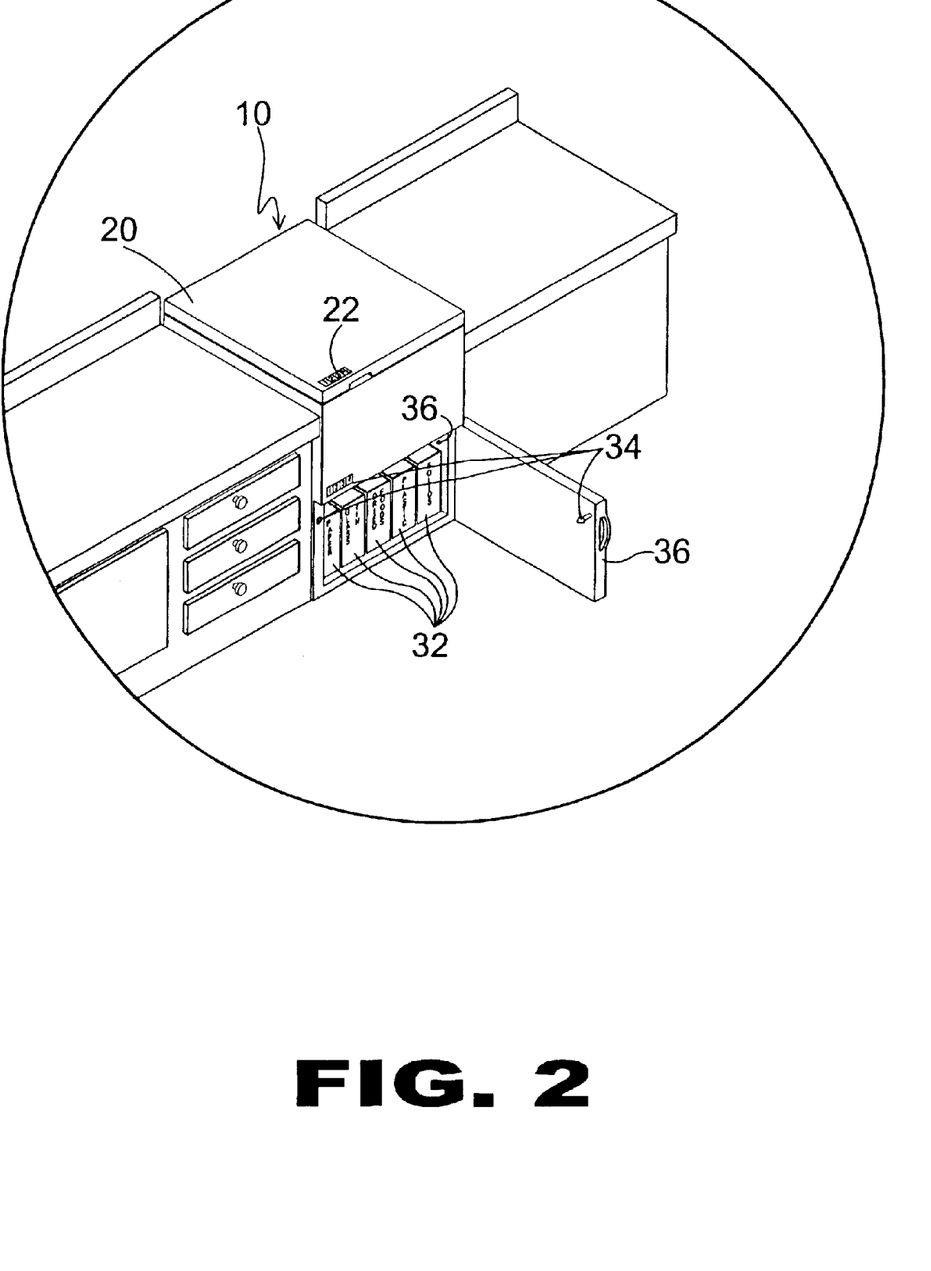
FIG. 2 is an illustrative view of the present invention in use.

Turning to FIG. 2, shown therein is an illustrated view of the present invention 10 in use. Once the various waste products are processed they are directed through transfer conduits into individually labeled recycling bins 32 or, alternately, one large bin that uses color-coded plastic liners for each recyclable item (emptied through a door affixed with a safety-lock to prevent tampering by children) thereby eliminating the necessity to manually sort the waste. Each bin 32 may also have transparent color-coded recycling bags to further increase the ease of sorting and recycling. The present invention 10 seeks to alleviate the burdens of recycling for the consumer, the municipalities and the recycling centers by reducing the bulk of recyclables and the cost of processing by eliminating the need for recycling centers to perform the initial steps of the recycling process. Non-degradable waste products such as batteries, bones and the like are not processed but transferred directly into the appropriate recycling bin once placed in the corresponding compartment. The safety-locks 22, 34 for the vanity door 36 and lid 20 are shown having a digital four-digit keypad similar to the entry locks used in the automotive industry wherein one access code could be used for the various entities utilizing a safety lock thereby providing maximum security that will not be compromised by children fumbling and playing with conventional mechanical, so-called child-proof lock mechanisms. Other suitable safety-locks may be used to restrict access to the processing and bin compartments 36.

Figure 3:
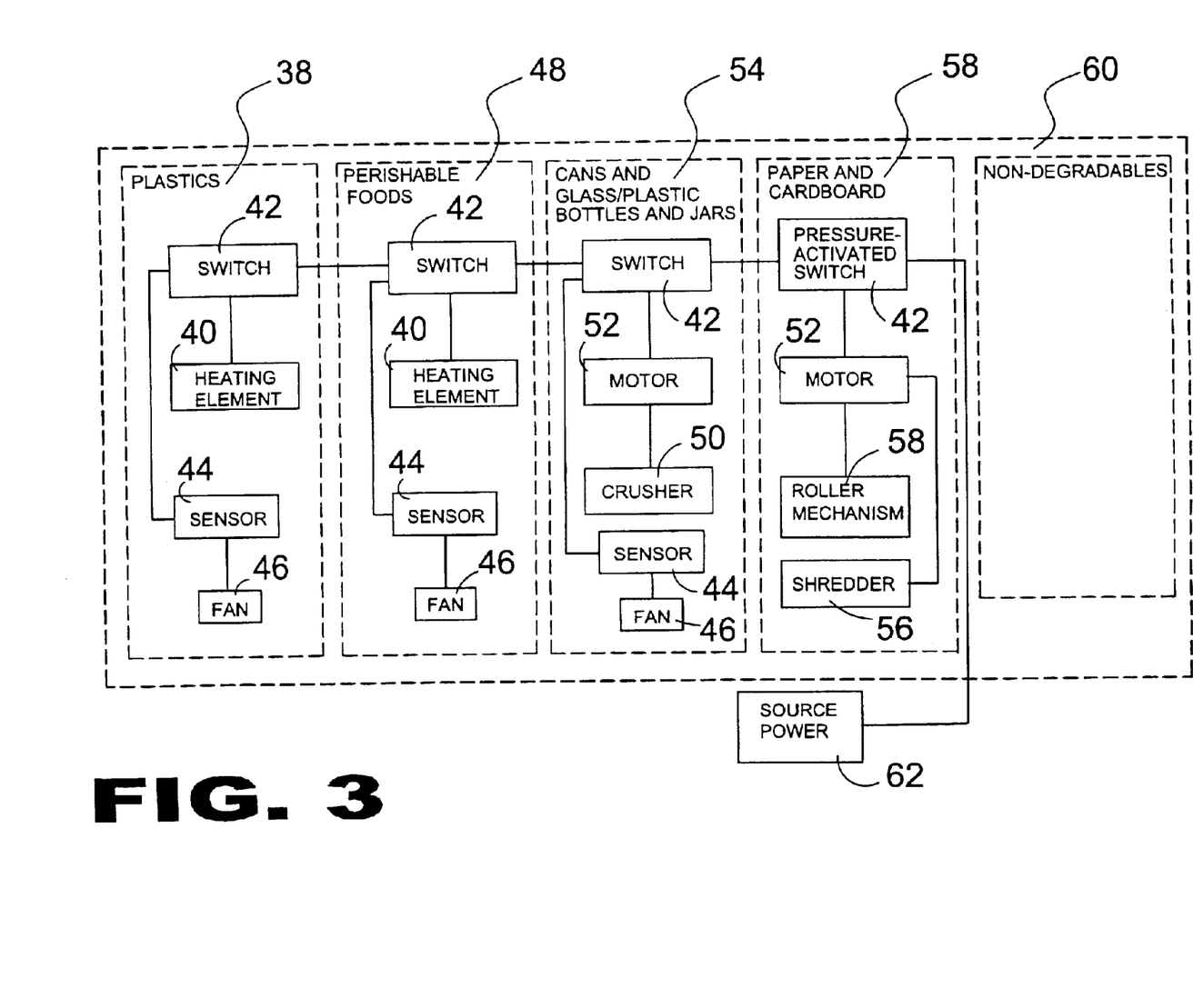
FIG. 3 is a block diagram of the present invention.

Turning to FIG. 3, shown therein is a block diagram of the present invention. Shown is a block diagram of the present invention depicting the five primary elements of the present invention and their respective components. For plastics 38 and dehydratable perishable foods 48, heating elements 40 having a control switch 42 with a sensor 44 and fan 46 are used to pelletize plastic 38 into bean-sized kernels and to dehydrate perishable foods 48. A crusher mechanism 50 having a motor 52, switch 42, sensor 44 and fan 46 is used to pulverize glass and compress cans 54 into flat plates and may include an optional UPC eye to read and register any applicable deposits for claiming refunds. A crosscut paper shredder 56 having a pressure activated switch 42, motor 52 and roller mechanism 58 is used to shred paper and cardboard 58. Non-biodegradable materials 60 such as batteries, bones and the like are not processed and are immediately transferred into the appropriate recycling bin through its respective transfer conduit. The home unit is preferably powered by 110 vac power source 62 whereas units adapted and designed for commercial usage may utilize a 220 vac power source accordingly depending on load and volume.

Figure 4:
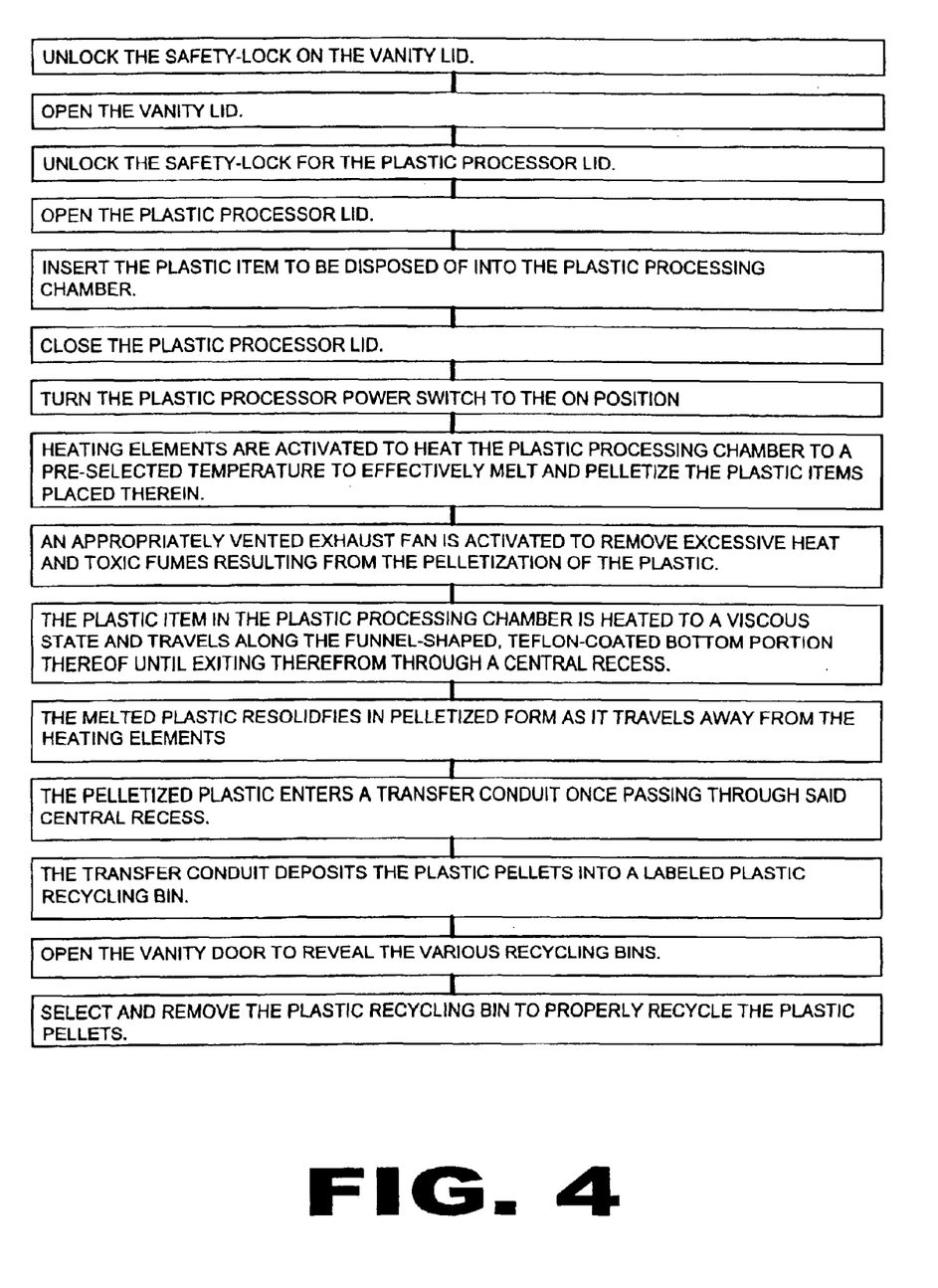
FIG. 4 is a flow chart demonstrating the operation of the plastic processing unit.

Turning to FIG. 4, shown therein is a flow chart of the plastic disposal unit of the present invention. The electrically operated trash compactor and recycling unit consists of a housing having five separate compartments for the disposal of different types of trash and garbage. The plastic disposal compartment consists of Teflon or nonstick layer coated interior walls. When plastic items are deposited within the compartment, a switch would be depressed to activate the heating elements within the upper portion of the compartment. The beat is then applied and transferred to the plastic trash item, shrinking it to small, kernel size pellets which fall through the bottom of the compartment and into the corresponding recycling bin to be reused as recycled plastic. Smoke and excessive heat created during the shrinking process would be vented out through an exhaust port.

Figure 5:
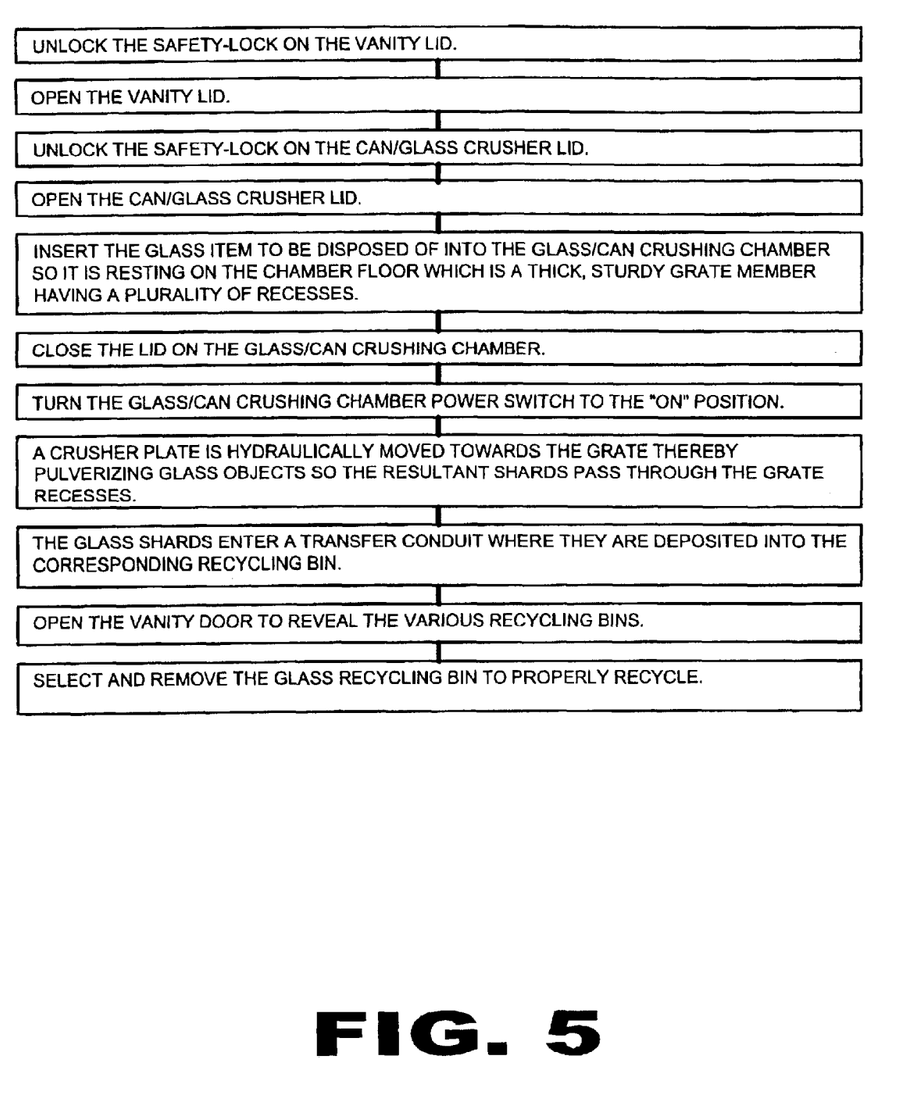
FIG. 5 is a flow chart demonstrating the operation of the crushing unit with a glass object

Turning to FIG. 5, shown therein is a flow chart demonstrating the operation of the crushing unit with a glass object. Shown is a flow chart of the crushing unit of the present invention as applied to glass. A glass object is placed into the crusher compartment and the lid is replaced thereon. A power switch is thrown to initiate the hydraulic movement of a crusher plate against a metal grate strong enough to withstand the brunt of the repeated pressure applied thereto by the crusher plate. The glass fragments pass through the grate recesses and enter a transfer conduit that deposits them in the appropriate recycling bin.

Figure 6:
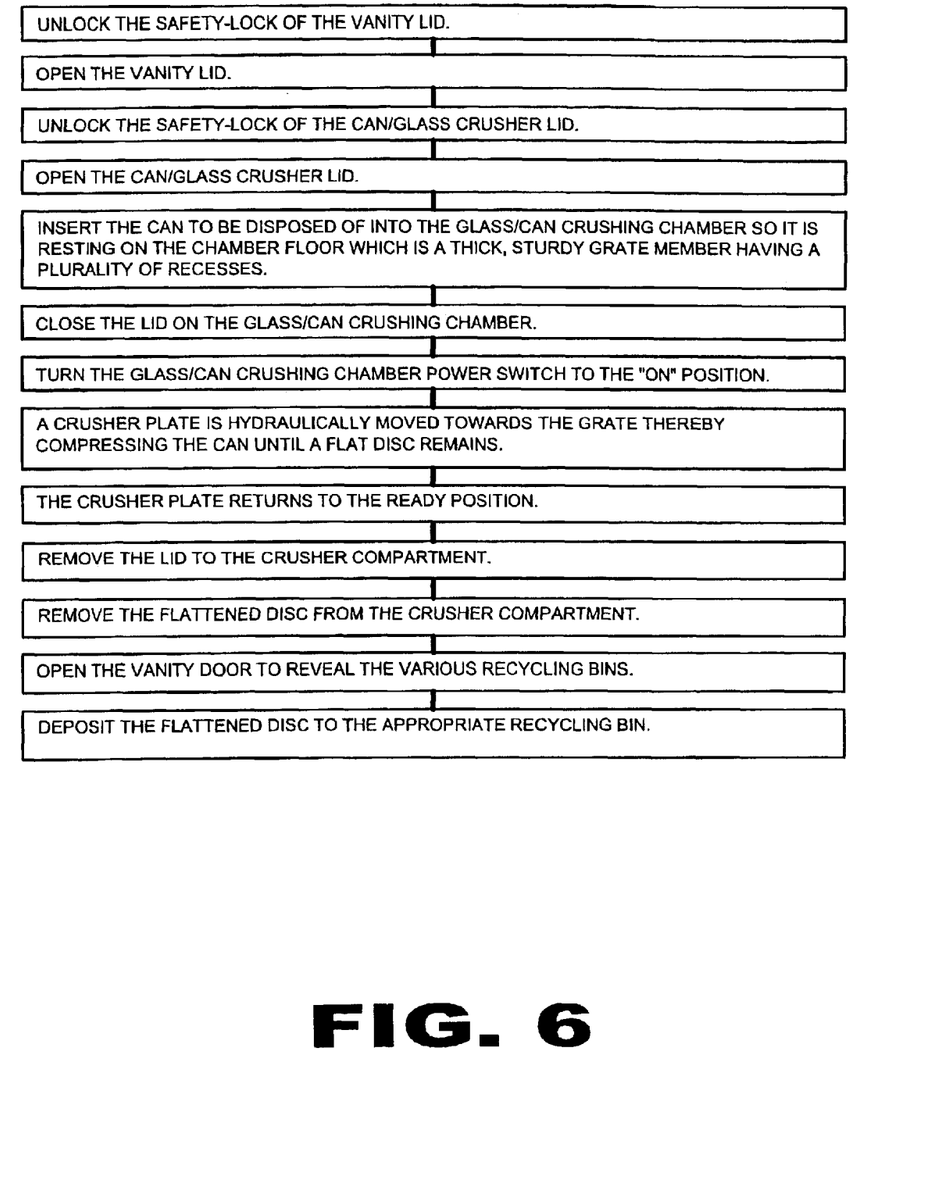
FIG. 6 is a flow chart demonstrating the operation of the crushing unit with an aluminum and tin can.

Turning to FIG. 6, shown therein is a flow chart demonstrating the operation of the crushing unit with an aluminum can. Shown is a flow chart of the crushing unit of the present invention as applied to metallic objects such as an aluminum or tin can. A can is placed into the crusher compartment and the lid is replaced thereon. The power switch is thrown to initiate the hydraulic movement of a crusher plate towards and against a metal grate strong enough to withstand the brunt of the repeated pressure applied thereto by said crusher plate. The can is compressed between the metal grate and the crusher plate until flattened into a plate. The flattened can is then manually removed by the user through a moon-shaped opening just above the metal grate that is covered with a hinged cover which opens by pulling it downward, removing the flattened can, and then it springs back by itself to the closed position. The can is then placed into the proper recycling bin.

Figure 7:
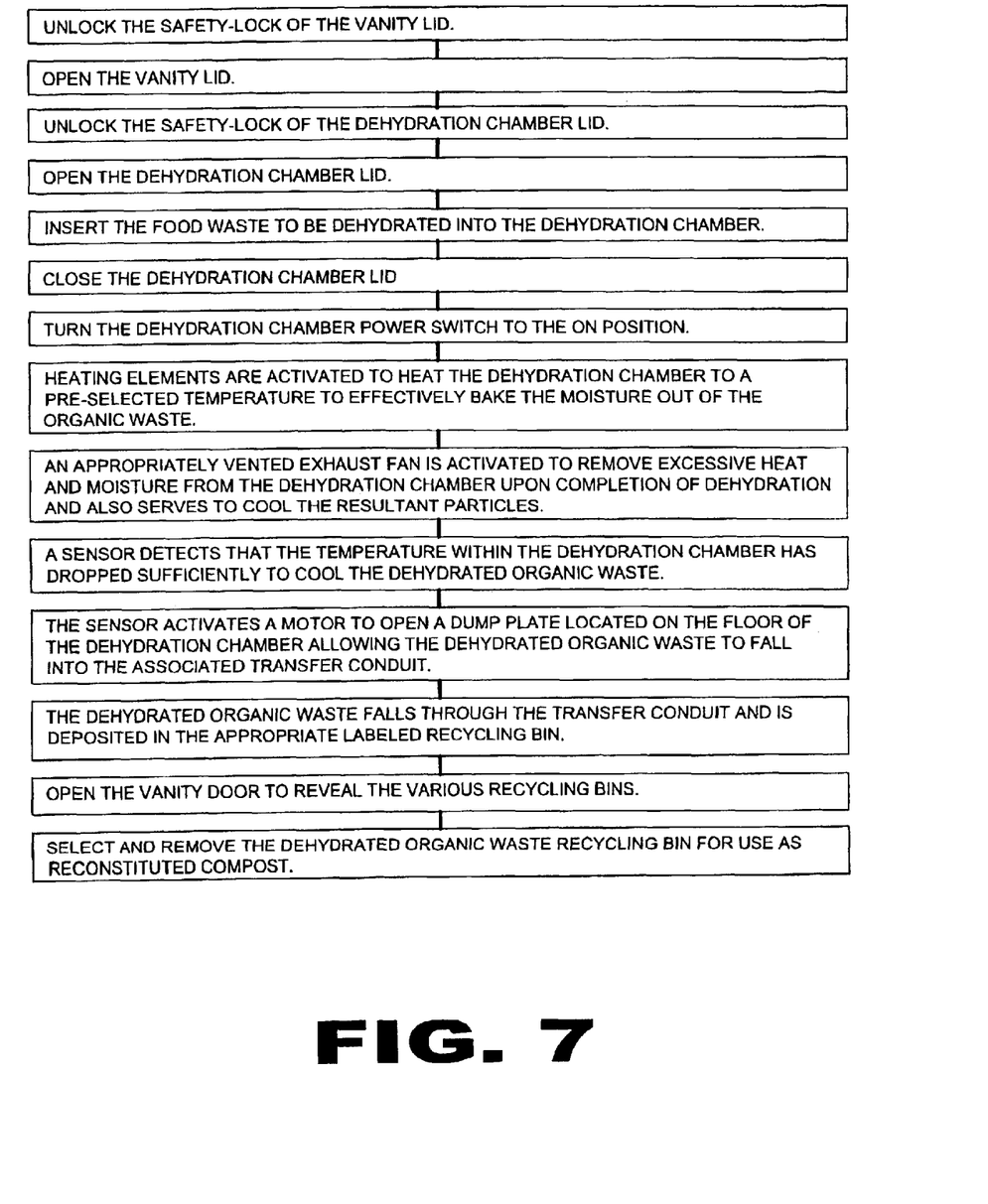
FIG. 7 is a flow chart demonstrating the operation of the dehydration processing unit.

Turning to FIG. 7, shown therein is a flow chart demonstrating the operation of the dehydration processing unit. Shown is a flow chart of the dehydration unit of the present invention. Perishable organic waste is placed into the dehydration chamber and the lid is replaced. When the accompanying switch is placed in the "on" position, heating elements within the dehydration chamber are activated to an adequate temperature to effectively remove the moisture from the contents therein until all that is left are odorless particles that can be stored for the sale and use as reconstituted compost. A fan is then initiated to cool dehydrated organic waste and heat created during the dehydration process would also be vented out through an exhaust port.

Figure 8:
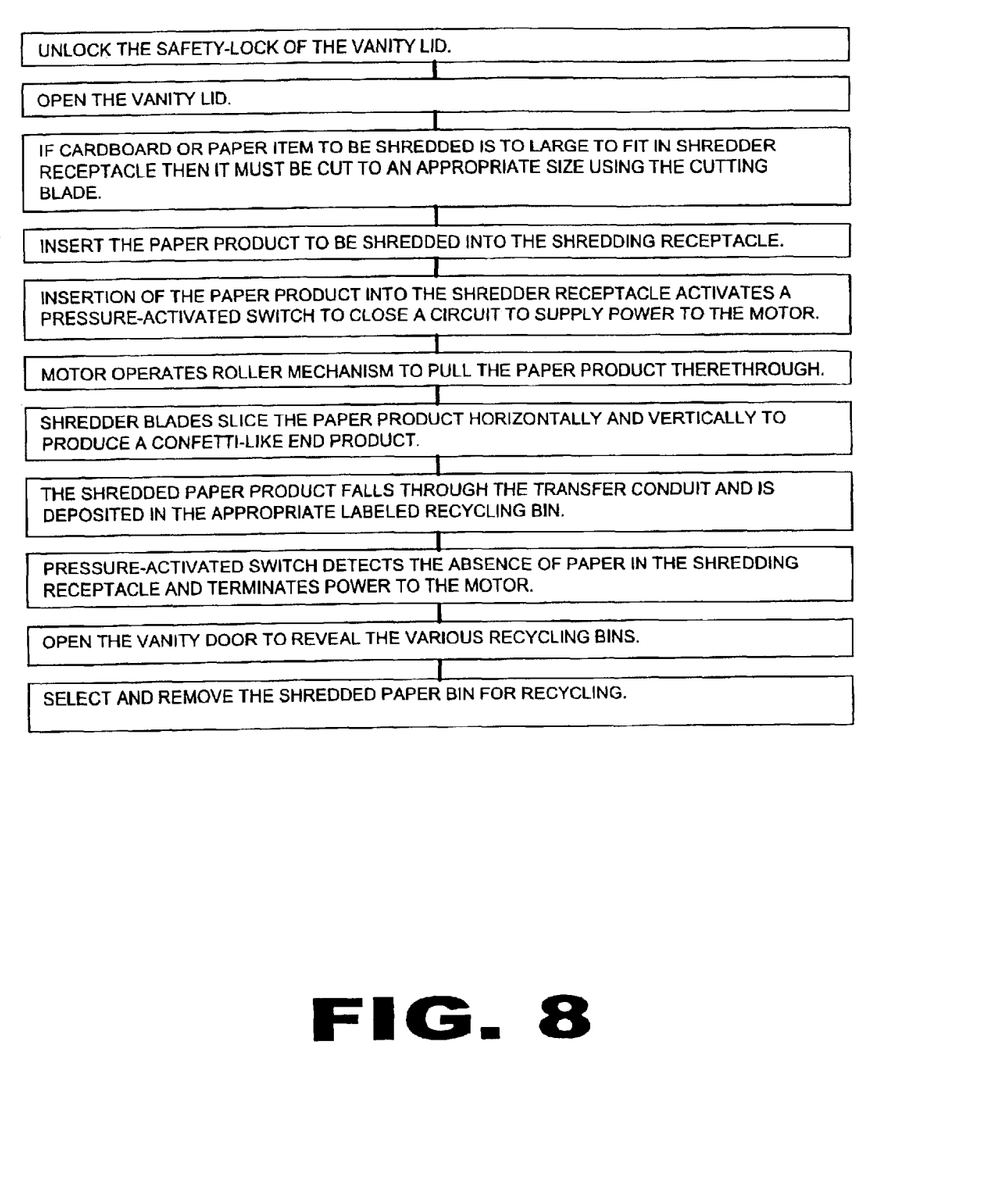
FIG. 8 is a flow chart demonstrating the operation of the paper-shredding unit.

Turning to FIG. 8, shown therein is a flow chart demonstrating the operation of the paper-shredding unit. Shown is a flow chart of the paper-shredding unit of the present invention. A paper product such as paper or cardboard is inserted into the shredding receptacle and turns on a pressure-activated switch to power up the motor and initiate the mechanical operation thereof. A roller mechanism feeds the paper product through crosscut shredder blades to reduce the paper product to confetti-like flakes that fall through the transfer conduit into the paper recycling bin. When all of the paper product that had been inserted has been effectively shredded, the pressure-activated switch responds by terminating power to the motor.

Figure 9:
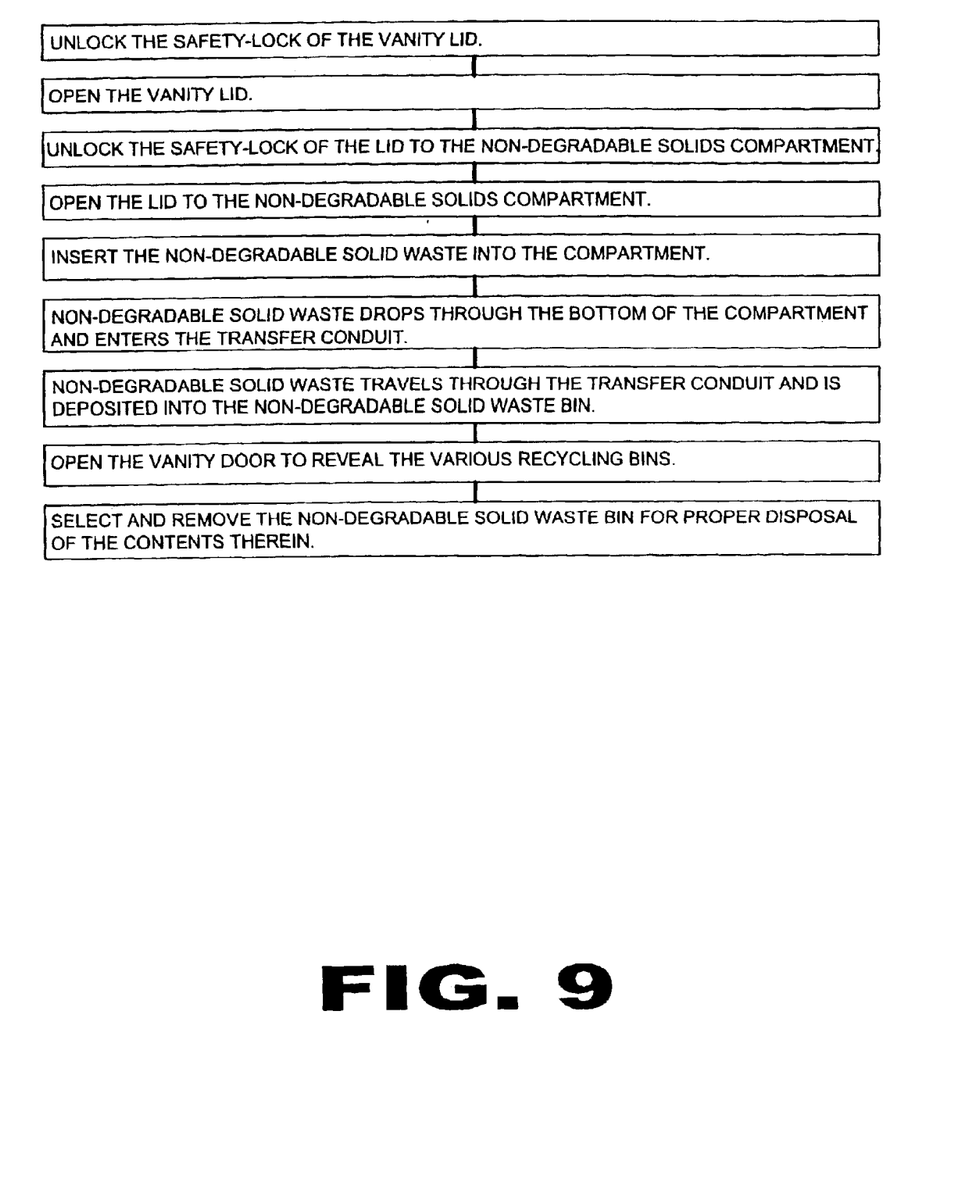
FIG. 9 is a flow chart demonstrating the operation of the non-degradable solid disposable unit

Turning to FIG. 9, shown therein is a flow chart demonstrating the operation of the non-degradable solids disposal unit. Although the present invention is designed to process the most common recyclable materials, there are still certain items that will require conventional solid waste removal such as bones, batteries and the like. Such items are to be placed into the solid waste compartment where they are then deposited into the non-degradable solid waste bin through the respective transfer conduit.

Figure 10:
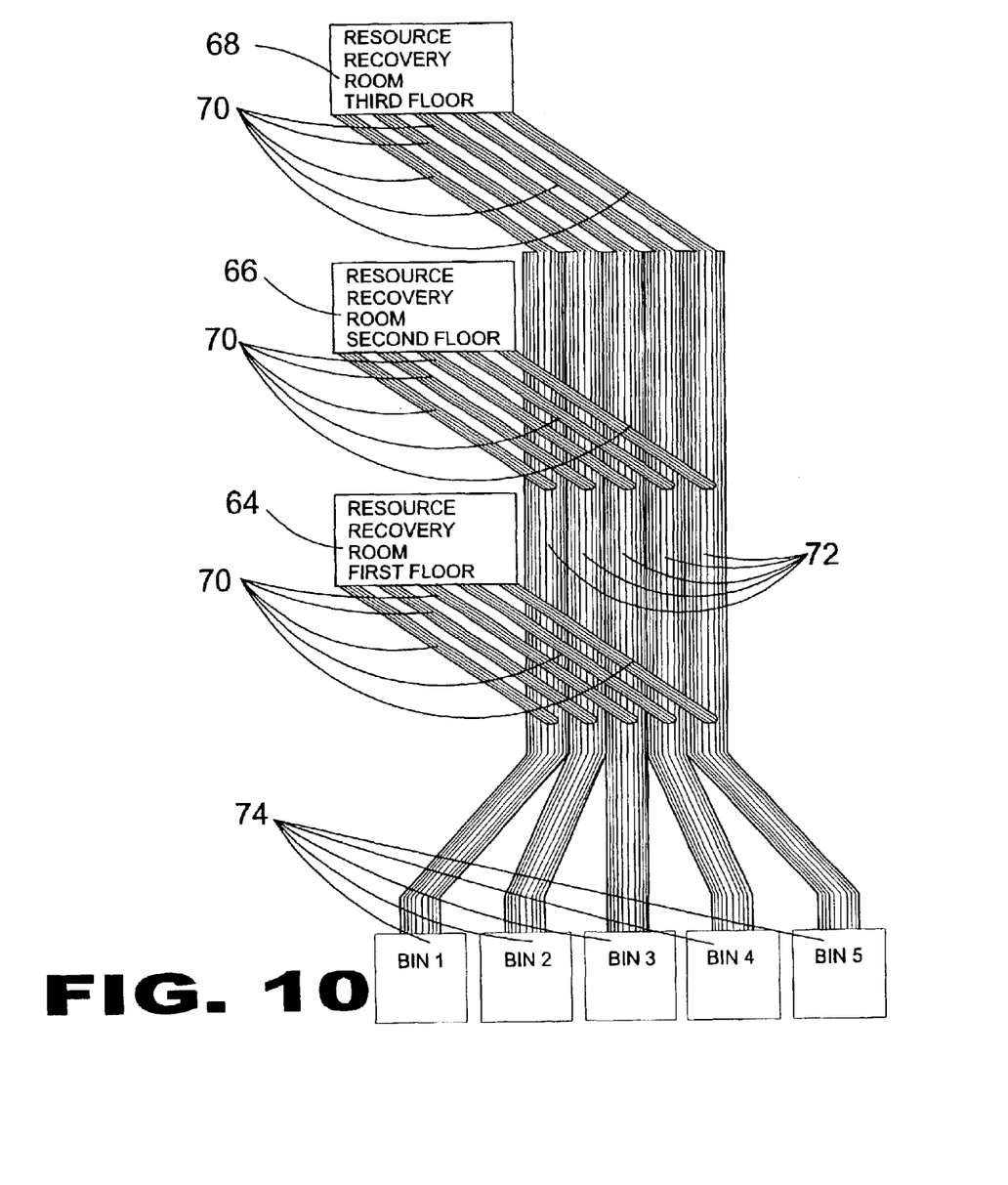
FIG. 10 is a schematic diagram of the transfer conduit system adapted for multi-family dwellings

Turning to FIG. 10, shown therein is a schematic diagram of the transfer conduit system of the present invention adapted for multi-family dwellings. The present invention is versatile and may be adapted in many ways without deviating from the concept for use in multi-family dwellings such as apartment buildings and for commercial applications. The concept and the primary components remain fundamentally the same but may also include common transfer conduits and recycling bins for transporting and storing the processed and non-degradable waste from a plurality of processing units within a structure. The configuration shown above has the transfer conduits of a plurality of units of the present invention 10 on the first floor 64, second floor 66 and third floor 68 with each floor unit leading to a common transfer conduit 70 leading into corresponding common transfer conduits and their respective recycling bins. The present invention may be configured as needed when built into new structures outfitted with a suction device for assuring optimum operation depending on the feasibility and applications.

Figure 11:
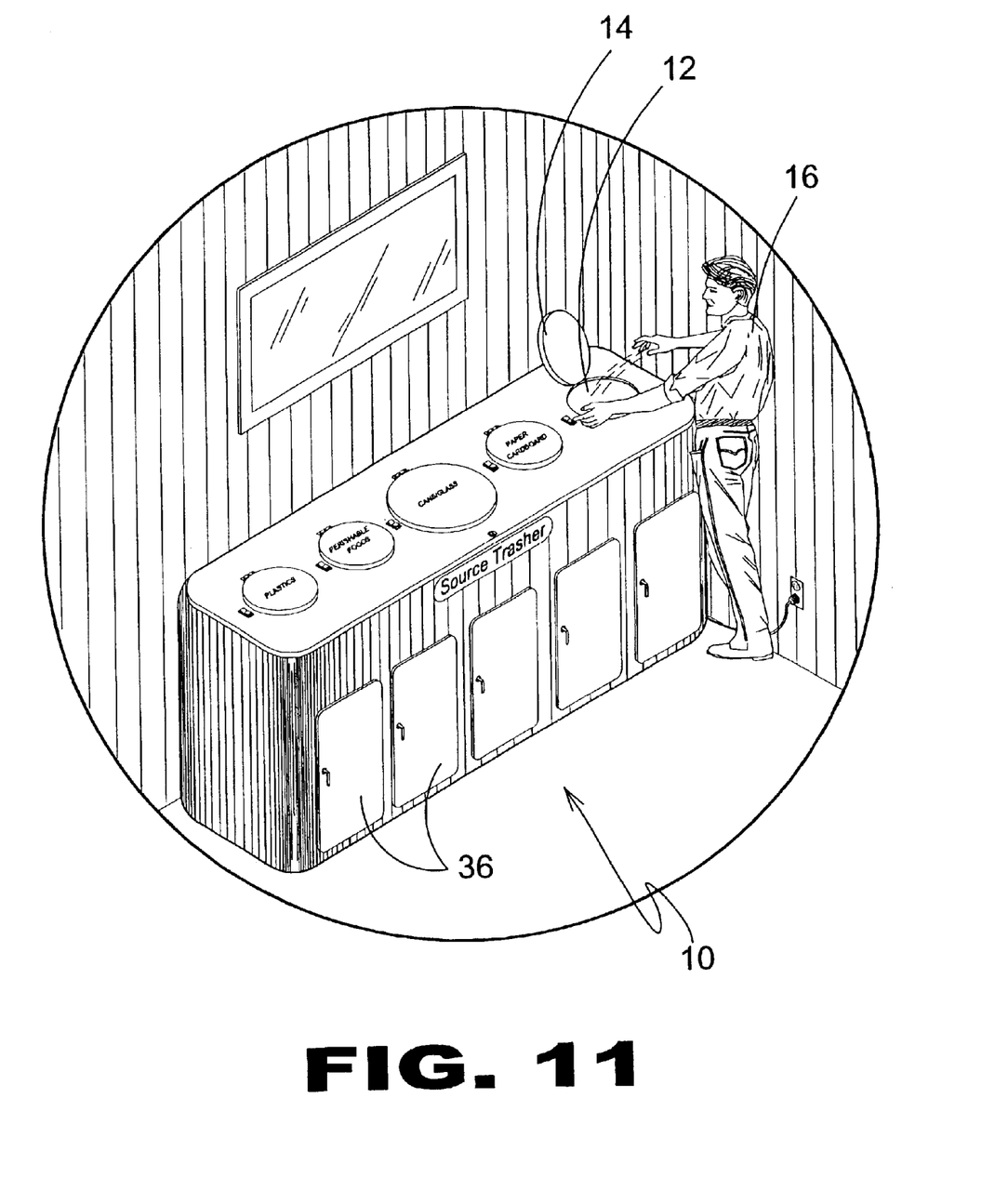
FIG. 11 is an illustrative view of a commercial embodiment of the present invention in use.

Turning to FIG. 11, shown therein is an illustrative view of a commercial embodiment of the present invention 10 in use. The present invention 10 may be reconfigured to suit the needs of specific applications. Shown above is the source trasher built to accommodate the higher volume required in commercial applications, however, its feature and operation are substantially the same as previously disclosed.

I claim:

1. A method for processing trash and garbage, comprising the steps of:
   a) providing a trash processor having a vanity lid therein, the vanity lid having a first safety lock thereon, wherein the trash processor has a plastics processor therein, the plastics processor having a lid thereon having a second safety lock thereon;
   b) placing plastics in the plastics processing chamber contained in the plastics processor;
   c) heating the plastics processing chamber to a temperature effective to melt the plastics placed therein;
   d) palletizing the melted plastics into a resolidified pellet form;
   e) exhausting excess heat and fumes from the plastics processing chamber;
   f) transferring the palletized plastics to a plastics recycling bin for temporary storage; and,
   g) removing the palletized pellets from the recycling bin for final disposal of the palletized pellets.

2. The method of claim 1, further comprising the steps of providing a plastics processing chamber being coated internally with a nonstick layer.

3. The method of claim 2, further comprising the step of providing a safety lock having a digital keypad for operation.

4. The method of claim 3, further comprising the steps of:
   a) providing a trash processor having a glass and can processor therein, the glass and can processor having a lid thereon having a separate safety lock thereon;
   b) placing glass items into the glass and can crushing chamber contained in the glass and can processor;
   c) crushing the glass;
   d) transferring the crushed glass to a glass and can recycling bin for temporary storage; and,
   e) removing the crushed glass from the recycling bin for final disposal thereof.

5. The method of claim 4, further comprising the steps of crushing the glass by using a crusher having a crusher plate which is moved hydraulically.

6. The method of claim 5, further comprising the steps of:
   a) placing cans into the glass and can crushing chamber contained in the glass and can processor;
   b) crushing the cans;
   c) transferring manually the crushed cans to a glass and can recycling bin for temporary storage; and,
   d) removing the cans from the recycling bin for final disposal thereof.

7. The method of claim 6, further comprising the steps of:
   a) providing a trash processor having a perishable food waste processor therein, the perishable food waste processor having a lid thereon having a separate safety lock thereon;
   b) placing food waste into the dehydration chamber contained in the perishable food waste processor;
   c) heating the dehydration chamber to a temperature effective to dry the food waste placed therein;
   d) exhausting excessive heat and moisture from the dehydration chamber;
   e) transferring the dried food waste to a food waste recycling bin for temporary storage; and,
   f) removing the dehydrated food waste from the food waste recycling bin for final disposal thereof.

8. The method of claim 7, further comprising the step of:
   a) sensing that the temperature within the dehydration chamber has dropped sufficiently to cool the dehydrated food waste; and,
   b) having the temperature sensor activate a motor to open a dump plate located on the floor of the dehydration chamber allowing the dehydrated food waste to be transferred into an associated transfer conduit to be transferred to the food waste recycling bin for temporary storage.

9. The method of claim 8, further comprising the steps of:
   a) providing a trash processor having a paper and cardboard processor therein, the paper and cardboard processor having a lid thereon having a separate safety lock thereon, the paper and cardboard processor having a shredder receptacle therein;
   b) examining the paper and cardboard items to determine if the paper and cardboard items are small enough to fit into the shredder receptacle and if the paper and cardboard items are too large to fit into the shredder receptacle, cutting the paper and cardboard items into a size small enough to fit into the shredder receptacle;
   c) placing the paper and cardboard items into the shredder receptacle;
   d) shredding the paper and cardboard items in the shredder receptacle;
   e) transferring the shredded paper and cardboard items to a paper and cardboard recycling bin for temporary storage; and,
   f) removing the shredded paper and cardboard from the recycling bin for final disposal thereof.

10. The method of claim 9, further comprising the steps of placing non-degradable solid material into a non-degradable solid waste storage bin for temporary storage and thereafter removing the non-degradable solid waste from the storage bin for final disposal thereof.

11. The method of claim 10, further comprising the steps of:
    a) placing the method for processing trash and garbage in a multi-family dwelling having multiple floors;
    b) providing a plurality of recycling bins large enough to contain the trash and garbage for the entire multi-family dwelling;
    c) connecting the recycling bins on each floor of the multi-story building for the plastics processor, the glass and can processor, the perishable food waste processor, the paper and cardboard processor, and the non-degradable waste to a common transfer conduit; and,
    d) transferring the trash and garbage collected for each floor into the plurality of recycling bins that contain the trash and garbage for the entire multi-family dwelling.

* * * * *